S. SHROCK.
Bee Hive.
No. 84,010.
Patented Nov. 10, 1868.
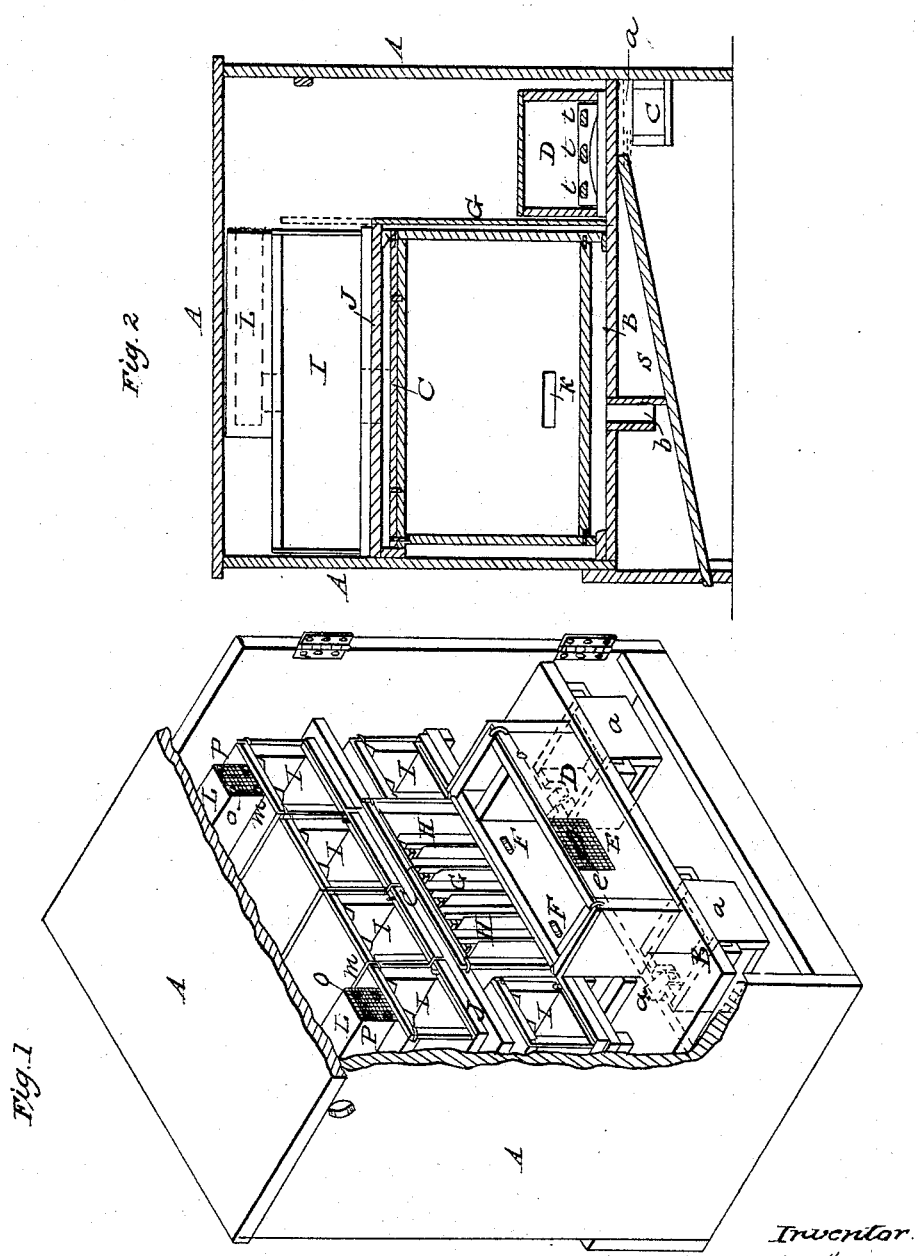

SIMON SHROCK, OF NEW PHILADELPHIA, OHIO.

Letters Patent No. 84,010, dated November 10, 1868.

IMPROVEMENT IN BEE-HIVES.

The Schedule referred to in these Letters Patent and making part of the same.

*To all whom it may concern:*

Be it known that I, SIMON SHROCK, of New Philadelphia, in the county of Tuscarawas, and State of Ohio, have invented certain new and useful Improvements in Bee-Hives; and I do hereby declare that the following is a full, clear, and exact description thereof, reference being had to the accompanying drawings, and to the letters of reference marked thereon, which form a part of this specification, in which—

Figure 1 is a perspective view of my bee-hive, with the door removed, and a portion of the outside casing broken away, and Figure 2 is a cross-section of the bee-hive.

Similar letters indicate like parts in both figures.

My invention relates to certain improvements in bee-hives, hereinafter more fully set forth.

In the accompanying drawings, A A is the outer casing.

C is the central hive, in which the comb-frames H H are slid in grooves made in the top and bottom of the central box or hive C, which is supported on the partition B.

This box or central hive C is made much larger than the honey-boxes I I, which lie contiguous to it, and has openings, K, on its sides, and also openings in its top, (which is the partition J,) which communicate with the honey-boxes I I, situated on each side of and above the central hive C, there being corresponding openings in the honey-boxes I I.

G is a glass, situated in rear, and forming one of the faces of the central hive C. This glass is capable of being slid up and down, the object of which will hereinafter be more fully explained.

S is a slant-board, for the ingress of the bees to the central hive C, through the tube $b$, and a corresponding opening in the bottom of the hive C.

D is a feed-box, for the bees, having a movable frame, with slats, $t\ t$, at its bottom, on which the feed for the bees is placed.

F F are openings in the feed-box D.

When it is desired to feed the bees, the glass end, G, of the box is raised, so that its lower end will rest on the feed-box D, when the bees will pass out of the central hive C, through the openings F F, into the feed-box D.

E is a piece of wire gauze, placed over the hole $o$ in one of the faces of the box D, for ventilating the latter.

$a'\ a'$ are drawers or traps, intended to catch moths and millers. These drawers slide in grooves, situated under the partition B, and are connected with the opening at the upper end of the slant-board by the tubes $a$, which lead directly into the drawers or traps $a'\ a'$. The moth or miller, on entering the tubes $a$, and from thence into the drawers or traps $a'\ a'$, will be unable to effect a passage into the hive.

L L are ventilating-boxes, having openings, $m\ m$, in their ends, over which is placed the wire gauze P. These boxes L L have openings in their bottoms, which fit over corresponding openings in the honey-boxes I I, so that the air passing through the openings $m\ m$ will circulate through the honey-boxes I I, central hive C, and feed-box D.

Having thus fully described my invention,

What I claim as new, and desire to secure by Letters Patent, is—

1. The combination and arrangement of the central hive C, provided with comb-frames H H, sliding face G, feed-box D, slant-board S, and central tube $b$, all constructed and operated in the manner and for the purpose set forth.

2. The combination of the central hive C, slant-board S, central tube $b$, openings K, honey-boxes I I, provided with corresponding openings, and ventilating-boxes L L, all constructed, arranged, and operated substantially as described.

3. The combination of the drawers $a'\ a'$, tubes $a\ a$, and slant-board S, all constructed, arranged, and operated as set forth.

4. The arrangement of the central hive C, slant-board S, central tube $b$, honey-boxes I I, ventilating-boxes L L, feed-box D, drawers $a'\ a'$, and tubes $a\ a$, all constructed and operated as set forth.

In testimony that I claim the foregoing as my own, I affix my signature in presence of two witnesses.

SIMON SHROCK.

Witnesses:
L. M. KNISELY,
DANIEL CHRISTY.